(12) United States Patent
Nishiwaki

(10) Patent No.: US 8,698,749 B2
(45) Date of Patent: Apr. 15, 2014

(54) INPUT APPARATUS, MOBILE APPARATUS, AND INFORMATION RECORDING MEDIUM

(75) Inventor: Kazuyuki Nishiwaki, Hachioji (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 12/069,209

(22) Filed: Feb. 8, 2008

(65) Prior Publication Data

US 2008/0218484 A1 Sep. 11, 2008

(30) Foreign Application Priority Data

Mar. 9, 2007 (JP) ................................. 2007-060627

(51) Int. Cl.
*G06F 3/02* (2006.01)

(52) U.S. Cl.
USPC ......... 345/169; 345/168; 400/472; 455/575.1

(58) Field of Classification Search
USPC ........................... 345/168–169; 400/472–496; 455/575.1–575.9; 340/20–34
See application file for complete search history.

(56) References Cited

U.S. PATENT DOCUMENTS

| | | | | |
|---|---|---|---|---|
| 5,784,060 A | * | 7/1998 | Bertram et al. | 715/840 |
| 7,312,410 B2 | * | 12/2007 | Griffin et al. | 200/5 A |
| 2003/0090466 A1 | * | 5/2003 | Kuo | 345/168 |
| 2003/0122784 A1 | * | 7/2003 | Shkolnikov | 345/169 |
| 2004/0005183 A1 | * | 1/2004 | MacFarlane | 400/472 |
| 2006/0119581 A1 | * | 6/2006 | Levy | 345/168 |
| 2006/0135226 A1 | | 6/2006 | Won et al. | |
| 2007/0054711 A1 | * | 3/2007 | Moon | 455/575.3 |
| 2007/0279387 A1 | * | 12/2007 | Pletikosa et al. | 345/169 |
| 2011/0279374 A1 | * | 11/2011 | Park et al. | 345/168 |

FOREIGN PATENT DOCUMENTS

| | | |
|---|---|---|
| JP | 63-177217 | 7/1988 |
| JP | 6-149435 | 5/1994 |
| JP | 08-137593 | 5/1996 |
| JP | 10-49272 | 2/1998 |
| JP | 2005-012493 | 1/2005 |
| JP | 2006-509479 | 3/2006 |
| JP | 2006-233998 | 9/2006 |
| WO | WO 2004/054210 | 6/2004 |

* cited by examiner

*Primary Examiner* — Lun-Yi Lao
*Assistant Examiner* — Gene W Lee
(74) *Attorney, Agent, or Firm* — Cozen O'Connor

(57) ABSTRACT

Keys that structure the keyboard have a diamond-shaped form that is symmetrical in both the vertical and the horizontal directions, disposed so that none of the edges of the surface in which the keyboard is formed are parallel with any of the edges of the diamond shapes. To each key is applied a marking in one or two orientations depending on the orientation of use of the mobile communications terminal. In the keyboard, these types of keys are laid out in a staggered pattern, wherein the markings are applied in positions that are on a straight line that passes through each of the keys in two rows of keys that are adjacent in the vertical direction on keys that are used when the mobile communications terminal is used in the horizontal orientation.

14 Claims, 9 Drawing Sheets

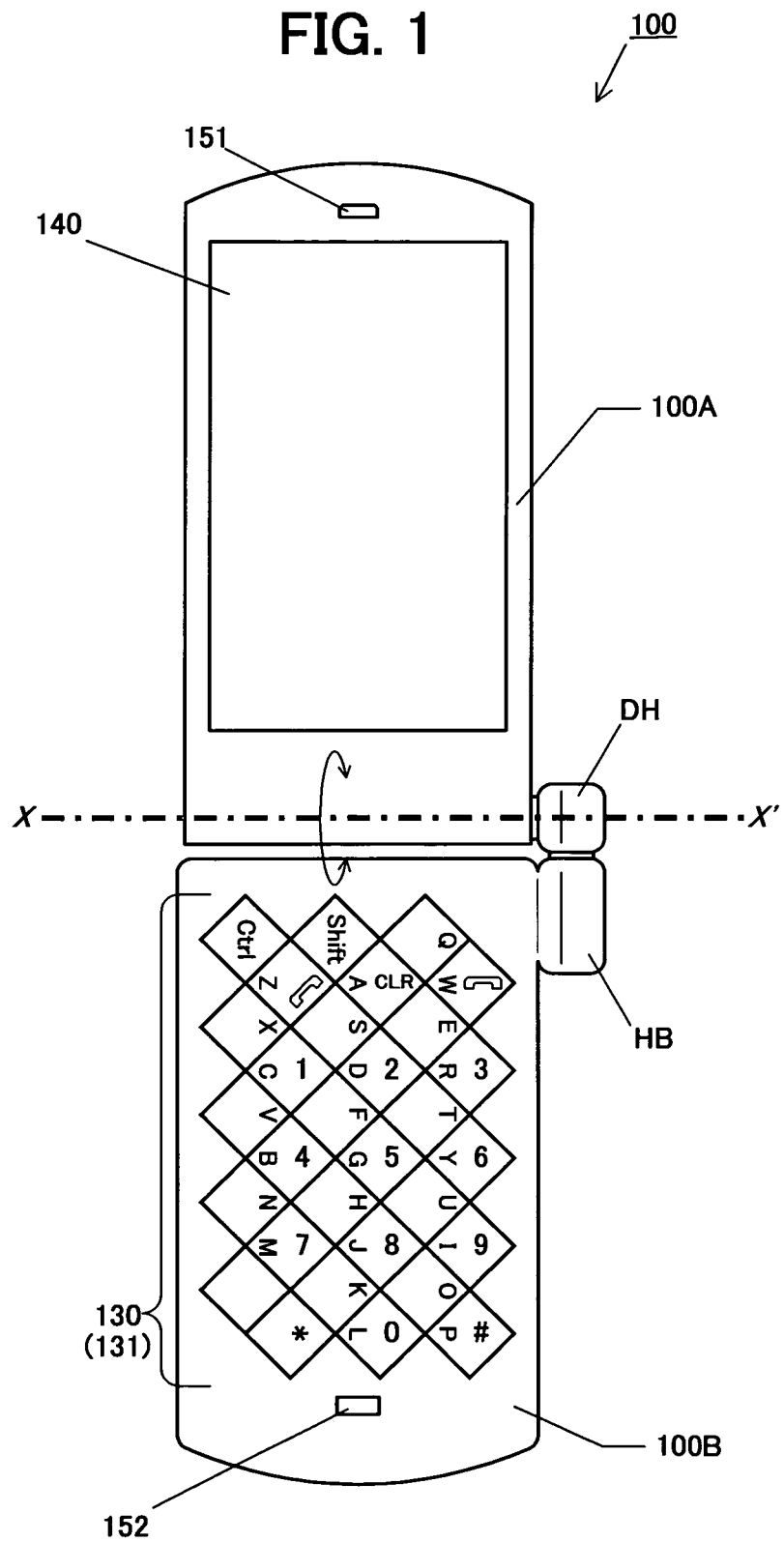

| FUNCTION | ORIENTATION OF USE |
|---|---|
| TELEPHONE FUNCTION | VERTICAL |
| E-MAIL FUNCTION | HORIZONTAL |
| ⋮ | ⋮ |
| TELEVISION RECEIVING FUNCTION | HORIZONTAL |
| VIDEO IMAGING FUNCTION | HORIZONTAL |
| ⋮ | ⋮ |

FUNCTION SETTING TABLE

| ORIENTATION OF USE | KEY NUMBERS |
|---|---|
| HORIZONTAL | ALL THE KEYS |
| VERTICAL | 1,3,5,⋯ |

KEY SETTING TABLE

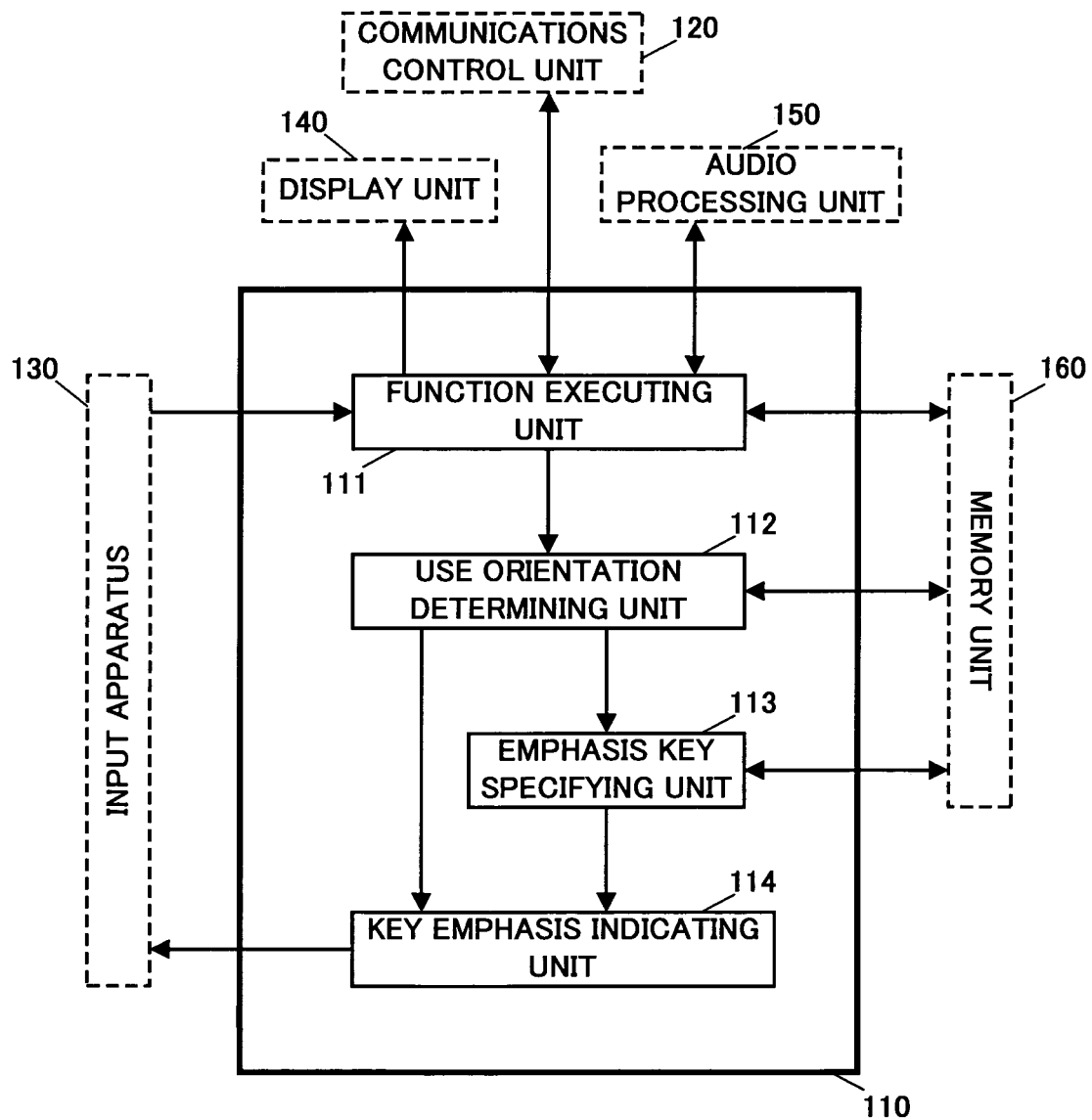

INPUT APPARATUS, MOBILE APPARATUS, AND INFORMATION RECORDING MEDIUM

BACKGROUND OF THE INVENTION

1. Field of the Invention

The present invention relates to an input apparatus, a mobile apparatus, and an information recording medium, and in particular, relates to an input apparatus, a mobile apparatus, and an information recording medium that are well-suited to inputting in a small apparatus.

2. Description of the Related Art

Mobile communications terminals, such as mobile telephones, have the telephone function as the main function thereof, and thus, fundamentally, the input keys thereof are keys for a telephone. Additionally, in order to function as a telephone receiver, typically the housing as a whole is used in a lengthwise orientation. Additionally, from the perspective of ease of use of the keys, typically keys of a horizontal form factor are used.

On the other hand, given improvements in performance and functionality of mobile communications apparatus, there are those that are equipped with video imaging functions or television receiving functions, or equipped with functions that are compatible with higher information processing apparatus, such as personal computers (for example functions for executing business application software, functions for displaying web pages produced using personal computers, or the like). In mobile communications terminals, which are focused on the conventional telephone functions, there are no particular impediments to convenience even when using the display screen normally in the vertical orientation; however, because videos and screens for personal computers, and the like, have horizontal aspect ratios, display screens for portable telephones are often of a form that uses the horizontal orientation.

In consideration of this tendency, mobile communications terminals have been brought to market that can be used in both the vertical orientation and the horizontal orientation through, for example, innovations in the housing structure. For example, Unexamined Japanese Patent Application KOKAI Publication No. 2006-233998 discloses a structure that can be opened and closed in both the vertical orientation and the horizontal orientation in a foldable mobile communications terminal, wherein the mobile communications terminal can be used in either the vertical orientation or in the horizontal orientation depending on the application (a so-called "two-way style").

However, because consideration has not been given to the key layout of the input keys, when used in the horizontal orientation there are problems with ease-of-use. That is, when the housing is used in the horizontal orientation with the conventional key form factor, the shape of each key will be vertical relative to the user, reducing the ease-of-use with fingertips. Additionally, the markings on the keys accommodate only the vertical orientation, so when used in the horizontal orientation, the keys are also difficult to read.

Furthermore, when functions that are compatible with personal computers, and the like, are provided, or when e-mail functions are used, etc., making it necessary to input text, text entry using the toggle method, which is unique to mobile communications terminals, is inefficient. As a result, there have been requests for the provision of keyboards that are equivalent to the full keyboards that are used in personal computers, and the like, but the provision of full keyboards in a small mobile communications terminal is difficult using the conventional key layout and key structure.

SUMMARY OF THE INVENTION

The present invention is the result of contemplation on the situation described above, and the object thereof is to provide an input apparatus, a mobile apparatus, and an information recording medium that enables excellent ease-of-use and efficient input.

An input apparatus as set forth in a first aspect of the invention for achieving this object comprises: an input apparatus that can be used in two orientations; wherein keys that are symmetrical both vertically and horizontally and on which markings are applied in one or two orientations, depending on the orientation in which the input apparatus will be used, are laid out in a staggered pattern.

In this case, preferably the markings corresponding to one of the two orientations that can be used by the input apparatus are located on a line passing through each key, in the lengthwise direction, in two rows of keys that are adjacent to each other vertically in a staggered pattern array.

The input apparatus described above, wherein preferably the shape of the keys is diamond-shaped, and the keys are laid out oriented so that the edges of the diamond shapes are not parallel with the edges that form the face wherein the keys are laid out.

The input apparatus described above, wherein preferably a plurality of keys that are shaped in the diamond shapes are laid out on a straight line so that the crowning points of the diamond shapes are adjacent to each other to form a plurality of rows of keys; the edges of the diamond-shaped keys that structure the one row of keys are adjacent to the edges of the diamond-shaped keys that structure another row of keys to form the two rows of keys.

The mobile apparatus as set forth in a second aspect of the invention for achieving this object comprises a housing that is structured from a substantially rectangular surface and an input apparatus that is structured on one face of the housing; the mobile apparatus being capable of executing functions that are used when the housing is in the vertical orientation and capable of executing functions that are used when the housing is in the horizontal orientation; wherein the input apparatus comprises a keyboard with keys that are symmetrical both vertically and horizontally, and with keys that have key tops in one or two orientations depending on the orientation in which the housing will be used, and are laid out in a staggered pattern.

The mobile apparatus described above, wherein preferably the keyboard is laid out with keys in a staggered pattern array, the key top markings corresponding to a case when the mobile apparatus is used in the horizontal orientation are marked so as to be located on a line passing through each key in two rows of keys that are adjacent to each other vertically.

The mobile apparatus described above, wherein preferably the keys is diamond-shaped, the keys are laid out oriented so that the edges of the diamond shapes are not parallel with the edges of the face structure of the input apparatus.

Preferably the mobile apparatus further comprises a key emphasizing unit for emphasizing the markings of the keys according to the orientation of the mobile apparatus used by a function depending on the function that is executed by the mobile apparatus.

In this case, preferably the mobile apparatus further comprises an orientation detecting unit for detecting the orientation of use of the mobile apparatus; wherein the key emphasizing unit identify the keys to be emphasized based on the orientation detected by the orientation detecting unit.

Additionally, preferably the mobile apparatus is structured from at least two housings that can open and close in both the vertical and the horizontal orientations; wherein the key emphasizing unit identifies the keys to be emphasized based on the opening and closing orientation of the housing.

A computer-readable information recording medium as set forth in a third aspect of the invention for achieving this object is able to cause a computer, which controls a mobile apparatus provided with a keyboard with markings that have marking orientations in one or two orientations, depending on the orientation of use of the mobile apparatus that is capable of executing functions that are used in the vertical orientation and functions that are used in the horizontal orientation, to execute: a function for determining the orientation used by the mobile apparatus; a function for specifying the keys of the keyboard to be emphasized, based on the determined orientation of use; and a function for controlling the emphasis of the specified keys.

BRIEF DESCRIPTION OF THE DRAWINGS

These objects and other objects and advantages of the present invention will become more apparent upon reading of the following detailed description and the accompanying drawings in which:

FIG. 1 is a diagram illustrating the external structure when a mobile communications terminal as set forth in an embodiment of the present invention is used in the vertical orientation;

FIG. 6 is a functional block diagram illustrating the functional structure that is achieved through the control unit illustrated in FIG. 4;

DETAILED DESCRIPTION OF THE PREFERRED EMBODIMENTS

Figure 2A:
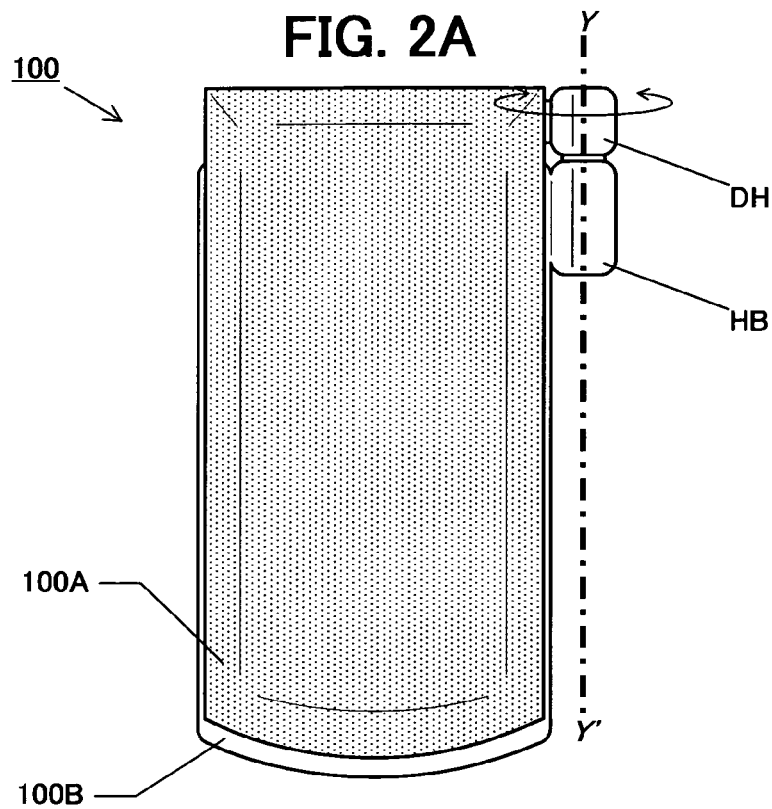
FIGS. 2A and 2B are figures illustrating the actual structure of the mobile communications terminal illustrated in FIG. 1, wherein 2A shows the external structure when the mobile communications terminal is in a closed state, and 2B shows the external structure when the mobile communications terminal is used in the horizontal orientation.

An embodiment as set forth in the present invention will be described below in reference to the drawings.

Embodiment 1

First the external structure of a mobile communications terminal 100 (mobile apparatus) as set forth in the present embodiment will be described in reference to FIG. 1, FIGS. 2A and 2B. The mobile communications terminal 100 as set forth in the present embodiment is a mobile communications terminal having, for example, a folding housing that can open and close in both the vertical and horizontal orientations. FIG. 1 is a schematic diagram illustrating the external structure when the mobile communications terminal 100 is used in the vertical orientation, and FIG. 2B is a schematic diagram illustrating the external structure when the mobile communications terminal 100 is used in the horizontal orientation.

First the main structures of the mobile communications terminal 100 will be described in reference to FIG. 1. As described above, the mobile communications terminal 100 as set forth in the present embodiment is of a folding type, so, as shown in FIG. 1, is structured from two housings, an upper housing 100A and a lower housing 100B. As shown in the figure, the upper housing 100A and the lower housing 100B each have shapes that are substantially rectangular in the primary surfaces thereof, and are structured so that the lengthwise directions of each are parallel.

Here, when the telephone function of the mobile communications apparatus 100 is used, the mobile communications apparatus 100 is used in the vertical orientation, as shown in FIG. 1. Thus in this shape a speaker 151 for outputting the received voice, or the like, is disposed on the upper housing 100A side in the vicinity of the ear of the user, and a microphone 152 for inputting speech, or the like, is disposed on the lower housing 100B side in the vicinity of the mouth of the user.

Furthermore, when the mobile communications terminal 100 is used in the vertical orientation, the user holds the lower housing 100B, so a keyboard 131 is disposed in the lower housing 100B side, and a display unit 140 is disposed in the upper housing 100A side.

The upper housing 100A and the lower housing 100B are connected foldably by a hinge base HB and a double hinge DH. The hinge base HB is secured to the lower housing 100B, and is supported so as to be able to rotate on the double hinge DH. Furthermore, the double hinge DH holds the upper housing 100A rotatably so as to have an axis of rotation that is perpendicular to the axis of rotation of the hinge base HB.

This type of structure enables the upper housing 100A to rotate with the axle X-X' shown in FIG. 1 as the axis of rotation so as to be able to open and close in the lengthwise orientation. That is, when the upper housing 100A is rotated towards the lower housing 100B side from the state shown in FIG. 1, the result is the closed state shown in FIG. 2A. This closed state is the state that is assumed when, for example, the mobile communications terminal 100 is not in use.

Figure 2B:
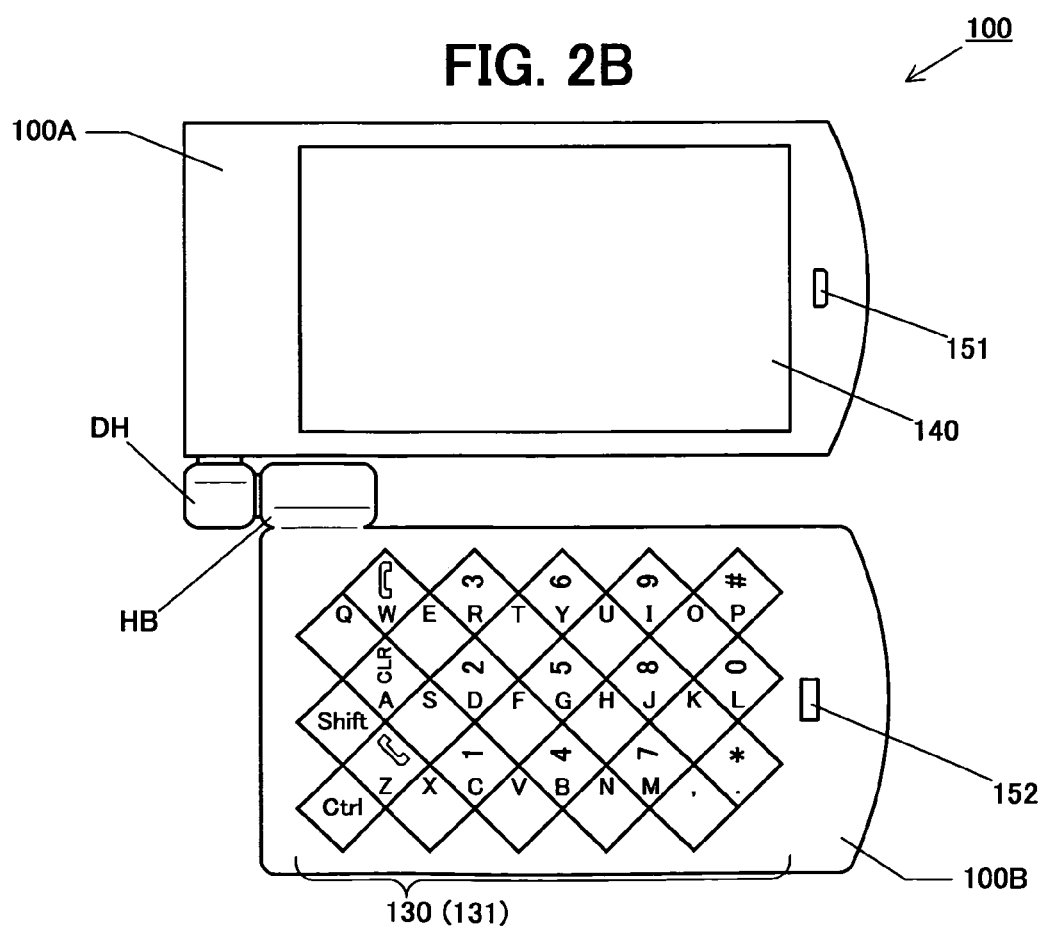

Here the double hinge DH is structured so as to be able to rotate relative to the hinge base HB, enabling the upper housing 100A to open and close in the horizontal orientation using the axle Y-Y', shown in FIG. 2A as the axis of rotation. That is, it is possible to open and close in the horizontal orientation as shown in FIG. 2B by rotating the upper housing 100A from the state shown in FIG. 2A on the axle Y-Y'. In this case, as shown in FIG. 2B, it is possible to use the vertical orientation of the mobile communications terminal 100 so as to be the horizontal orientation, so that the display unit 140 can be used in the horizontal orientation. Note that the structures of the double hinge DH and the hinge base HB that enable this type of operation can be achieved through the use of known technologies, such as disclosed in Unexamined Japanese Patent Application KOKAI Publication No. 2006-233998.

Furthermore, as shown in FIG. 1 and FIG. 2B, the input apparatus 130 (keyboard 131) is structured on the primary surface of the lower housing unit 100B. Each key that structures the keyboard 131, as shown in these figures, has a diamond-shaped form factor that has vertical symmetry and horizontal symmetry. Additionally, each key is disposed so that no edge of the diamond shaped will be oriented so as to be parallel with any of the edges that structure the primary surface (the substantially rectangular shape) of the lower housing 100B wherein the keyboard 131 is disposed. Moreover, diamond-shaped keys of this type are arrayed so as to form a staggered pattern (mutually differing).

Figure 3A:
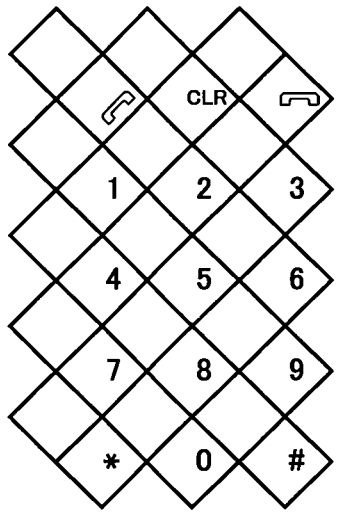
FIGS. 3A, 3B and 3C are figures for explaining the input apparatus (keyboard) illustrated in FIG. 1 and FIG. 2B, where 3A is a diagram illustrating the key markings (key tops) used when the mobile communications terminal is used in the vertical orientation, 3B is a diagram illustrating the key markings (key tops) used when the mobile communications terminal is used in the horizontal orientation, and 3C is a schematic diagram for explaining the marking positions of the key markings (key tops) illustrated in 3B.

A key top that displays the assigned character, or the like, is structured on each key in the keyboard 131. As is shown in FIG. 1 and FIG. 2B, the key tops include markings in an orientation corresponding to when the mobile communications terminal 100 is used in the vertical orientation, and markings in an orientation corresponding to when the mobile communications terminal 100 is used in the horizontal orientation. Examples of this type of key top markings will be described in reference to FIGS. 3A to 3C. To facilitate understanding, the markings corresponding to the vertical orientation will be explained separately from the markings corresponding to the horizontal orientation. FIG. 3A illustrates an example of markings for the key tops corresponding to the vertical orientation, and FIG. 3B illustrates an example of markings for the key tops corresponding to the horizontal orientation.

FIG. 3A is a diagram illustrating an example of the markings on the key tops corresponding to when the mobile communications terminal 100 is used in the vertical orientation. As described above, in the present embodiment, the mobile communications terminal 100 is in the vertical orientation when the telephone function is used, so the markings on the numeric keys used in inputting the telephone numbers and on the function keys used in the hook operations are applied to each key in an orientation that can be visually recognized correctly by the user when the mobile communications terminal 100 is used in the vertical orientation.

Figure 3B:
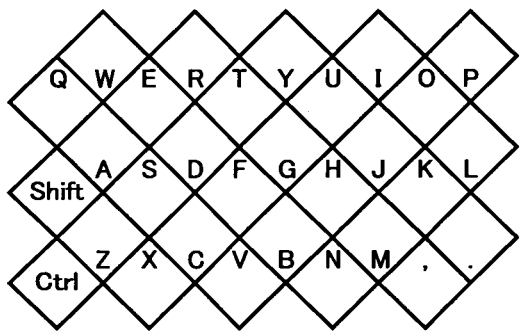

FIG. 3B is a diagram illustrating an example of the markings on the key tops corresponding to when the mobile communications terminal 100 is used in the horizontal orientation. In the present embodiment, a keyboard 131 is used wherein keys corresponding to a full keyboard, as used in a personal computer, and the like, are arrayed horizontally in order to facilitate more efficient text entry. In this case, as shown in FIG. 3B, key markings for character keys arranged in the so-called "QWERTY" arrangement, important function keys (the shift key, etc.), and the like are applied to the individual keys in an orientation that can be recognized correctly visually with accuracy by the user when used in the horizontal direction.

Figure 3C:
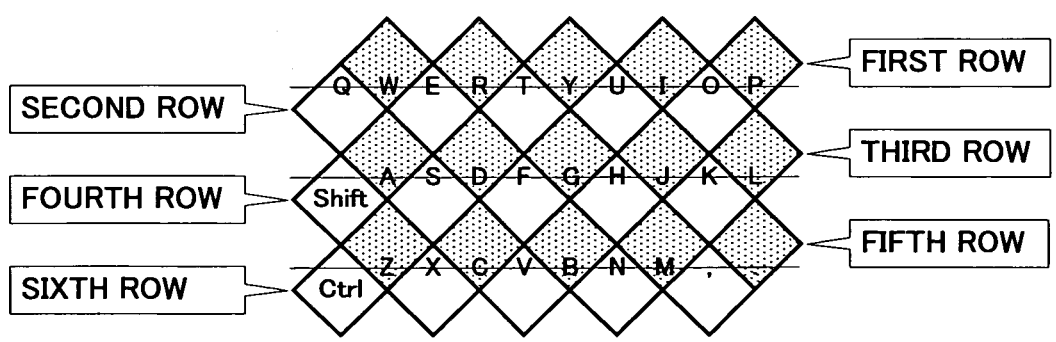

As described above, in the keyboard 131 the diamond-shaped keys are arrayed so as to form a staggered pattern (mutually differing). That is, when the mobile communications terminal 100 is in the horizontal orientation, then, as shown in FIG. 3C, rows of keys wherein a plurality of diamond-shaped keys are arrayed in a straight line in the horizontal direction are arrayed so as to form a staggered pattern (mutually differing) in the vertical direction. That is, the odd-numbered key rows indicated by the hatching in FIG. 3C are disposed alternatingly (mutually differing) with the even-numbered rows of keys therebetween.

In a full keyboard of a QWERTY arrangement that is used in, for example, personal computers, normally keys for inputting characters, and the like, are allocated into rows of keys extending in the horizontal direction. In the keyboard 131 in the present embodiment, the input keys for characters, etc., are assigned in an array that is similar to the QWERTY layout in order to obtain ease-of-use on par with a full keyboard. However, in a mobile communications terminal 100 that requires portability, the space for laying out the keys is limited, and so in the present embodiment the diamond-shaped keys are disposed tightly together alternatingly (mutually differing), where two rows of keys that are adjacent to each other in the vertical direction are used to assign keys that are equivalent to a single row in a conventional keyboard.

In other words, as shown in FIG. 3C, the characters for a single row in a QWERTY keyboard (Q, W, E, R, T, Y, etc.) are marked in positions on a straight line that passes through each of the keys that structure the first row and the second row of the keyboard 131. Similarly, markings for the characters, etc., for the next row in the QWERTY layout (A, S, D, F, G, H, etc.) are applied to positions on a straight line that passes through each of the keys that structure the third and fourth rows of keys in the keyboard 131, and markings for the characters, etc., for the following row in the QWERTY layout (Z, X, C, V, B, N, etc.) are applied to positions on a straight line that passes through each of the keys that structure the fifth and sixth rows of the keys in the keyboard 131.

By structuring in this way it is possible to achieve any keyboard that includes nearly all of the important characters, etc., of the QWERTY layout using 30 keys. Moreover, it is possible to layout the keys efficiently, even in a small mobile communications terminal, with only 60% of the surface area required for laying out 30 keys when compared to the substantially rectangular keyboard that is often used in conventional mobile communications terminals, through having the diamond-shaped form factor that is able to be packed tightly alternatingly (mutually differing).

The diamond shaped that is the key shape that can be laid out in this way is vertically symmetrical and horizontally symmetrical, and regardless of the use orientation, the keys are disposed in an orientation that forms a diamond shape (wherein the lines between opposing corners are vertical and horizontal). Consequently, regardless of whether the orientation for use of the mobile communications terminal 100 is the vertical orientation or the horizontal orientation, there will be an identical shape both vertically and horizontally for the keys operated by the fingertips of the user, making it possible to achieve excellent ease-of-use.

Moreover, because the key tops are key markings corresponding to each of the two orientations that are used by the mobile communications terminal 100, regardless of the orientation in which the mobile communications terminal 100 is used, the key markings can be recognized easily by the user.

Embodiment 2

When an input apparatus 130 (keyboard 131) such as shown in the aforementioned Embodiment 1 is used, an emphasizing operation so as to clearly define the keys to use may be performed. An example of a structure and method by which to achieve this type of operation will be explained in the present embodiment.

Figure 4:
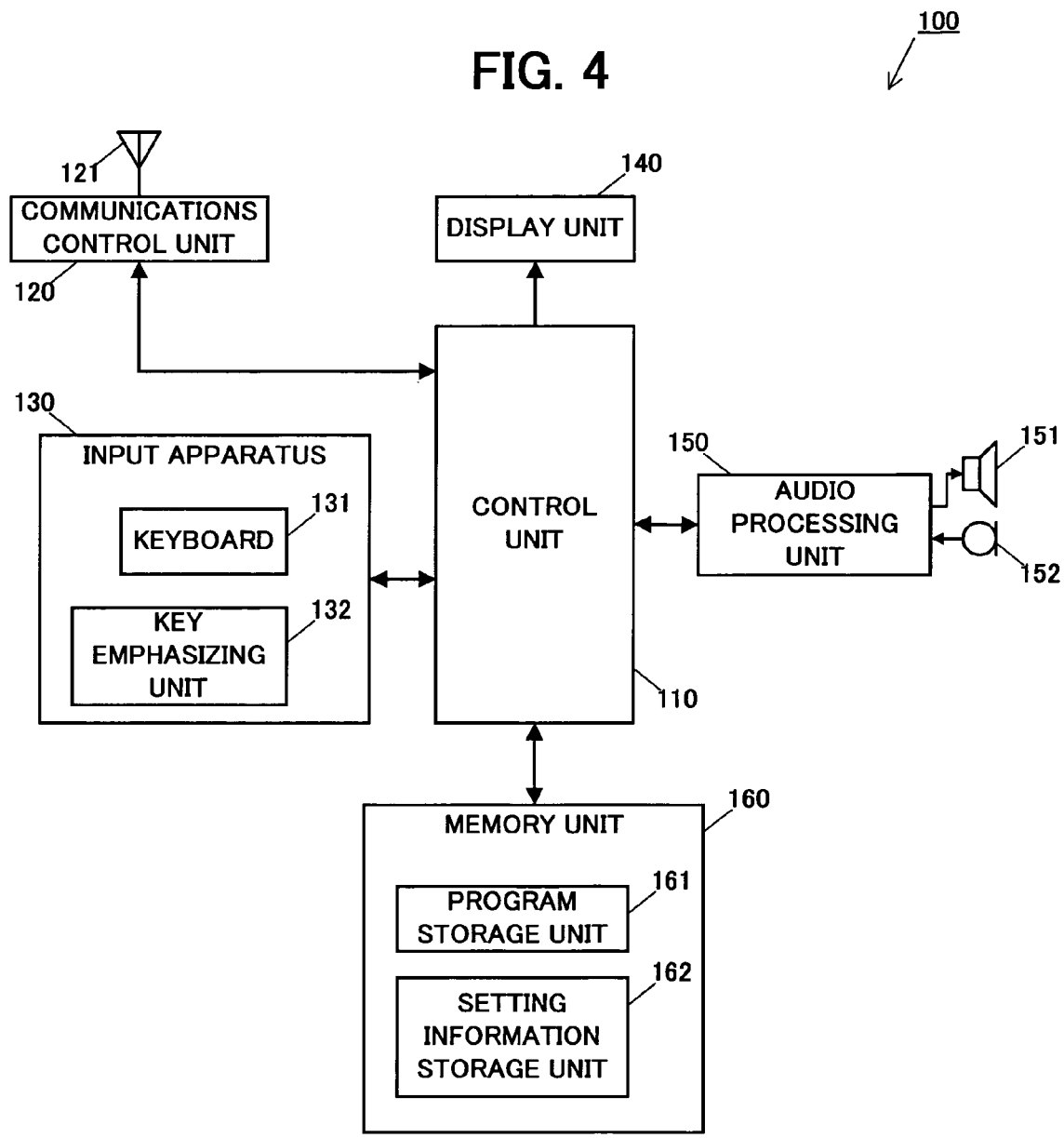
FIG. 4 is a block diagram showing the internal structure of a mobile communications terminal as set forth in a second embodiment of the present invention.

A mobile communications terminal (mobile apparatus) according to the present embodiment is the mobile communications terminal 100 illustrated in the first embodiment, so the same reference numbers will be used as the reference numbers used in the first embodiment for the same structures. The internal structure of the mobile communications terminal 100 by which to achieve the operations described above in the present embodiment will be explained in reference to FIG. 4. FIG. 4 is a block diagram showing the internal structure of a mobile communications terminal 100.

As illustrated, the mobile communications terminal 100 comprises a control unit 110, a communications control unit 120, an input apparatus 130, a display unit 140, an audio processing unit 150, a memory unit 160, and so forth.

The control unit 110 is structured from, for example, a CPU (central processing unit) and RAM (random access memory), and controls each unit of the mobile communications terminal 100. In the present embodiment, the control unit 110 executes a program to achieve each of the functions for achieving the various processes described below.

The communications control unit 120 is structured from, for example, a transceiver apparatus for performing the communications operations for the mobile communications terminal 100, and the communications operations between the mobile communications terminal 100 and the base station BS are achieved by controlling the wireless transmission and reception operations by the antenna 121.

The input apparatus 130 is provided with a keyboard 131 and a key emphasizing unit 132. The keyboard 131 is the keyboard 131 illustrated in Embodiment 1. The input apparatus 130 generates an input signal in response to the operation of the keyboard 131, and inputs the signal into the control unit 110.

The key emphasizing unit 132 performs operations for emphasizing those keys, of the keys that structure the keyboard 131, indicated by the control unit 110. In the present embodiment, an emphasizing operation is performed for the keys indicated by an operation that illuminates (backlights) a key on the keyboard 131. In the present embodiment, the key emphasizing unit 132 controls the illumination by the key unit. In this case, the key emphasizing unit 132 is structured by an illumination control apparatus that controls a light source such as an LED (light emitting diode) disposed under each key, for example, and emphasizes the key by illuminating the light source for the key indicated by the control unit 110.

The display unit 140 is structured from, for example, a liquid crystal display device, and outputs displays for screens for the various functions of the mobile communications terminal 100.

The audio processing unit 150 is structured from, for example, an audio codec, and performs audio input/output operations for the various functions of the mobile communications terminal 100. That is, along with converting into an analog audio signal the digital audio signal inputted by the communications control unit 120 and outputting it from the speaker 151, the audio processing unit 150 converts the voice that is inputted from the microphone 152 into a digital audio signal and supplies it to the communications control unit 120 to achieve the voice communications.

The memory unit 160 is structured from, for example, a flash memory or hard disk device, and stores the data and programs, and the like, required for the operation of the mobile communications terminal 100. In the present embodiment, memory regions such as a program storage unit 161 and a setting information storage unit 162 are provided, and specific data are stored in the respective memory regions.

The program storage unit 161 is an area for storing the programs that are executed by the control unit 110. In the present embodiment, along with programs (application programs, and the like) for producing the various functions that can be executed by the mobile communications terminal 100 and the programs (such as the operating system) for achieving the overall operation of the mobile communications terminal 100, there is also a program stored for performing the key emphasizing operations.

The setting information storage unit 162 stores the setting information for the key emphasizing operation by the key emphasizing unit 132. In the present embodiment, the key emphasizing operation for the keyboard 131 is performed in response to a function that is executed by the mobile communications terminal 100. Consequently, a "function setting table" that establishes in advance the association between the functions (such as an application, or the like) that are executed by the mobile communications terminal 100 and the orientations of use (the vertical orientation or the horizontal orientation) of the mobile communications terminal 100 at the time that those functions are executed, and a "key setting table" that establishes in advance the association between the orientation of use of the mobile communications terminal 100 and the keys to be emphasized at that time, are stored in the setting information storage unit 162. Examples of information stored in each table are shown in FIGS. 5A and 5B.

Figure 5A:
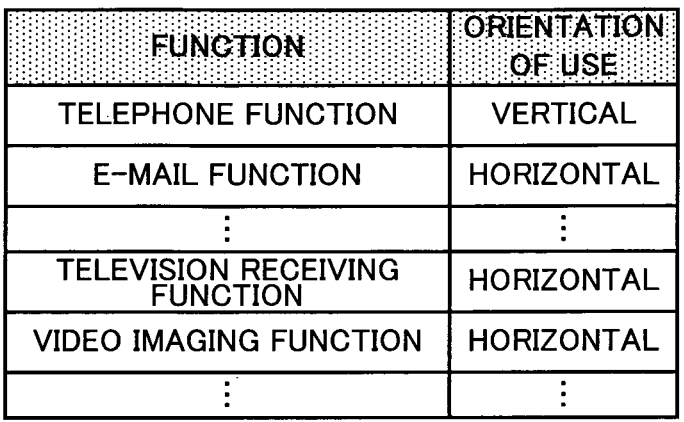
FIGS. 5A and 5B are diagrams for explaining the information that is stored in the setting information storage unit illustrated in FIG. 4, where 5A shows an example of a function setting table that is stored in the setting information storage unit, and 5B shows an example of a key setting table that is stored in the setting information storage unit.

FIG. 5A is a diagram illustrating an example of the information that is stored in the function setting table. As is illustrated, the function setting table lists "Vertical" for the information indicating the orientation of use for the functions (for example, telephone functions, or the like), of those functions that can be performed by the mobile communications terminal 100, for which the use of the mobile communications terminal 100 in the vertical orientation is preferred, and lists "Horizontal" for the information indicating the orientation of use for the functions (such as the television receiving function, the video imaging function, the web browsing function, and the e-mail function) for which use in the horizontal orientation is preferred.

Here the orientation for which use is preferred is established not only based on, for example, the ratio of the screen that is displayed by the display unit 140, but also on, for example, the method of use of the keyboard 131. In other words, when executing functions that perform a screen display with a horizontal ratio, such as video functions (that is, television receiving functions, video imaging functions, etc.), use in the form shown in FIG. 2B so that the display unit 140 will be in the horizontal orientation (or at least in a form wherein the upper housing 100A is in the horizontal orientation) is performed, and even when executing functions that are mainly text entry (such as e-mail functions, and the like), use in the form shown in FIG. 2B, wherein the key layout corresponding to the full keyboard can be used (or at least, in the form wherein the lower housing 100B is in the horizontal orientation) is preferred, so "Horizontal" is associated with these functions as the orientation of use.

Figure 5B:
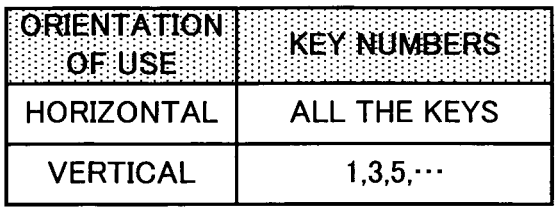

FIG. 5B shows examples of information listed in the key setting table. As is illustrated, the key numbers that indicate the keys to be emphasized are associated with each of the orientations of use set in the function setting. Here unique key numbers are set in advance for each of the keys that structure the keyboard 131.

The structure of the functions that are executed by the control unit 110 executing the programs that are stored in the program storage unit 161 will be described next. Of the functions that can be executed by the control unit 110, those functions to which the key emphasizing operation is applied by the key emphasizing unit 132 will be explained here. In this case, the control unit 110 functions as the structures shown in FIG. 6. That is, the control unit 110 functions as, for example, the function executing unit 111, the use orientation determining unit 112, the emphasis key specifying unit 113, the key emphasis indicating unit 114, and the like.

The function executing unit 111 works in conjunction with the various units of the mobile communications terminal 100 to execute the programs that are stored in the program storage unit 161, in response to instruction input from the keyboard 131 of the input apparatus 130, to not only perform the indicated functions, but also notify the use orientation determining unit 112 as to which function will be executed.

The use orientation determining unit 112 determines the use orientation associated with the function that has been executed by the function executing unit 111, based on the function setting table of the setting information storage unit 162.

The emphasis key specifying unit 113 specifies the keys of the keyboard 131 to be emphasized depending on the use orientation determined based on the key setting table of the setting information storage unit 162.

The key emphasis indicating unit 114 indicates to the key emphasizing unit 132 the light source to be illuminated corresponding to the specified key, to cause the key emphasizing operations to be performed corresponding to the use orientation of the function to the executed.

In the present embodiment, the control unit 110 executes programs to achieve the various functions shown in FIG. 6, but the functions may be achieved through hardware structures, such as ASICs (application specific integrated circuits), instead.

The structures described above are the structures that are required for embodying the present invention, and other structures (such as a camera, a television receiver tuner, or the like) required for the main functions or for additional functions for the mobile communications terminal may be provided as necessary.

Figure 7:
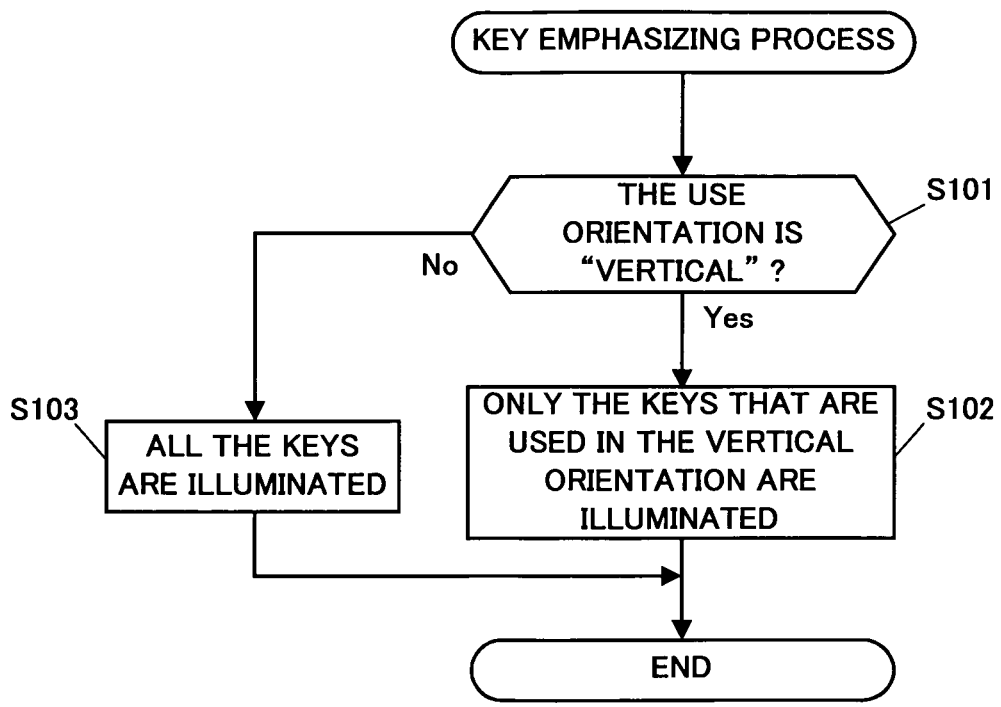
FIG. 7 is a flowchart for explaining the "key emphasizing process" in a second embodiment and a third embodiment as set forth in the present invention.

The operation of the mobile communications terminal 100, having the structures described above, will be explained below. Here the "key emphasizing process" that is performed when a function, such as an application that can be executed by the mobile communications terminal 100, is indicated will be explained in reference to the flowchart shown in FIG. 7. This key emphasizing process is started triggered by an instruction to execute a desired function through, for example, an operation of the keyboard 131 by the user of the mobile communications terminal 100.

In this case, the process is started through the function executing unit 111 executing the indicated function, and the function that has been executed by the function executing unit 111 is communicated to the use orientation determining unit 112.

The use orientation determining unit 112 accesses the function setting table of the setting information storage unit 162 to determine whether or not the use orientation of the mobile communications terminal 100 associated with the function that has been executed is the vertical orientation (Step S101).

Here, as shown in FIG. 2B, when the keyboard 131 is used as the full keyboard in the horizontal orientation, the associated key top markings are applied to substantially all of the keys, so when the use orientation of the mobile communications terminal 100 is the horizontal direction, all of the keys should be emphasized. On the other hand, when the keyboard 131 is used as the input keys for a telephone in the vertical orientation, the associated key top markings are applied to a portion of the keys, as shown in FIG. 2A. Consequently, in this case it is necessary to emphasize only the keys to which the markings are applied.

In other words, when the use orientation of the mobile communications terminal 100 is the vertical direction (Step S101: Yes), the use orientation determining unit 112 communicates this fact to the emphasis key specifying unit 113. In this case, the emphasis key specifying unit 113 accesses the key setting table of the setting information storage unit 162 to acquire the key numbers associated with the vertical orientation, and provides notification to the key emphasis indicating unit 114.

Figure 8A:
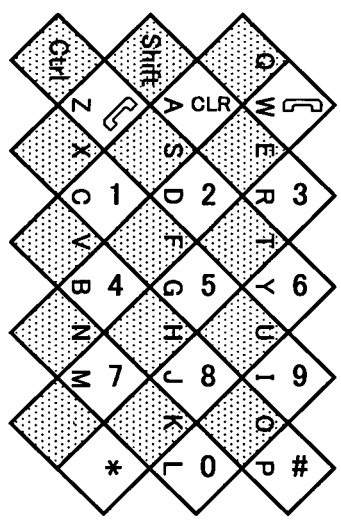
FIGS. 8A and 8B are diagrams for explaining key emphasis through the process shown in FIG. 7, where 8A shows an example of key emphasis when used in the vertical orientation, and 8B shows an example of key emphasis when used in the horizontal orientation.

The key emphasis indicating unit 114 instructs the key emphasizing unit 132 to illuminate the light sources associated with the key numbers communicated from the emphasis key specifying unit 113, so that, as shown in FIG. 8A, only the keys that are actually used when the mobile communications terminal 100 is used in the vertical orientation are illuminated, the keys to be used are emphasized (Step S102), and the process is ended.

Figure 8B:
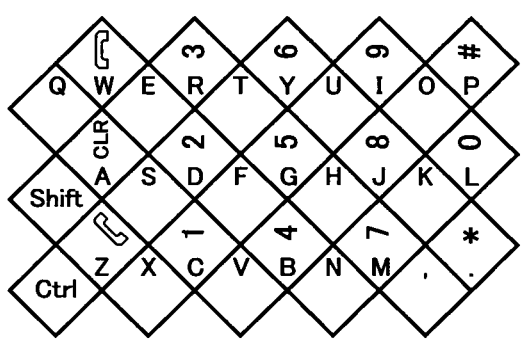

On the other hand, when the use orientation that is determined is the horizontal orientation (Step S101: No), the use orientation determining unit 112 communicates this fact to the key emphasis indicating unit 114. In this case, the key emphasis indicating unit 114 instructs the key emphasizing unit 132 to illuminate the light sources associated with all of the keys of the keyboard 131, so that, as shown in FIG. 8B, all the keys that are actually used when the mobile communications terminal 100 is used in the horizontal orientation are illuminated, and the keys to be used are emphasized (Step S103).

As described above, the keys to be used are emphasized automatically based on the use orientation that is associated with the function that is executed by the mobile communications terminal 100, so the user of the mobile communications terminal 100 can recognize easily the keys that are subject to operation.

Embodiment 3

Figure 9:
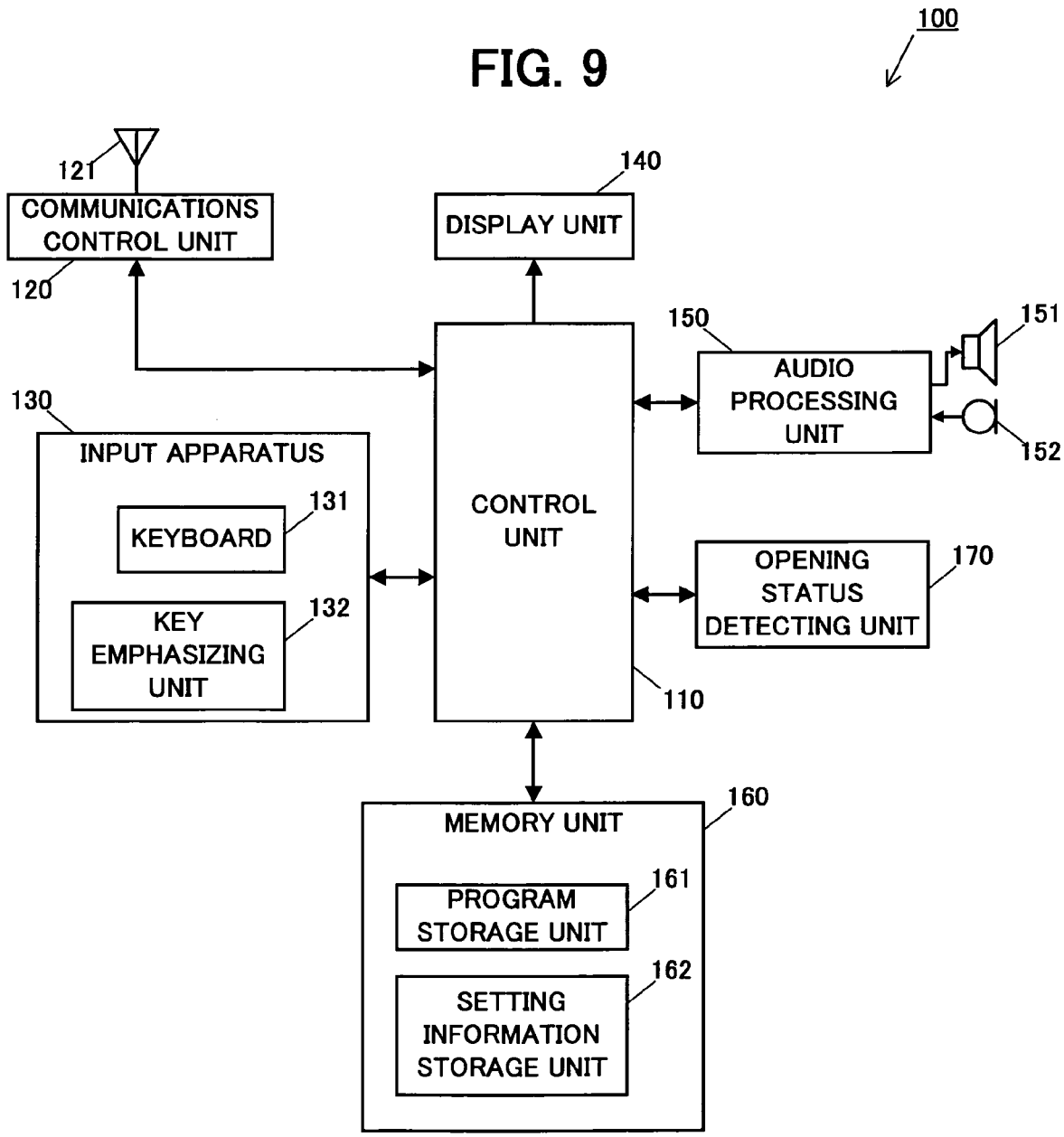
FIG. 9 is a block diagram showing the internal structure of a mobile communications terminal as set forth in a third embodiment of the present invention.

While in the second embodiment, described above, keys to the emphasized were specified based on the function to be executed, the keys to be emphasized can be specified based on the opening/closing orientation of the mobile communications terminal 100. A structure for achieving this type of operation is shown in FIG. 9. FIG. 9 is a block diagram showing the structure of a mobile communications terminal 100 (mobile apparatus) as set forth in the present embodiment.

Here the hardware structure of the mobile communications terminal 100 as set forth in the present embodiment is the structure of the mobile communications terminal 100 in the second embodiment, with the addition of an opening status detecting unit 170. Additionally, there is no need to store the function setting table, shown in the second embodiment, in the setting information storage unit 162. Only the opening status detecting unit 170, which is the difference from the mobile communications terminal 100 set forth in the second embodiment, will be explained below.

The opening status detecting unit 170 is structured from a sensor that is disposed on a mechanism unit that is linked to the opening/closing operations such as, for example, the double hinge DH or the image base HB, or disposed on the upper housing 100A and the lower house in 100B, to detect the opening orientation of the mobile communications terminal 100. In the present embodiment, opening is possible in both the vertical and horizontal directions through the double hinge DH, so, at least, sensors capable of detecting the direction of rotation in the double hinge DH are included in the opening status detecting unit 170. This type of opening status detecting unit 170 inputs a detection signal, when required, into the control unit 110.

In the case of this type of structure, the use orientation determining unit 112 can determine the direction of orientation based on the detection signal from the opening status detecting unit 170. In other words, when an opening/closing operation of the upper housing 100A using the axle X-X' shown in FIG. 1 as the axis of rotation is detected, the mobile communications terminal 100 has been opened or closed in the vertical orientation. When the operation in this orientation is performed from a closed state, as shown in FIG. 2A, it can be determined that the mobile communications terminal 100 has been opened in the vertical orientation, and is in the state shown in FIG. 1. In this case, the use orientation determining unit 112 can determine that the use orientation of the mobile communications terminal 100 is the "vertical orientation." Consequently, key emphasis corresponding to the vertical orientation can be performed through the same process as the key emphasizing process shown in FIG. 7.

Additionally, when an opening/closing operation of the upper housing 100A using the axle Y-Y' shown in FIG. 2A as the axis of rotation is detected, the mobile communications terminal 100 has been opened or closed in the horizontal orientation. When the operation in this orientation is performed from a closed state, as shown in FIG. 2A, it can be determined that the mobile communications terminal 100 has been opened in the horizontal orientation, and is in the state shown in FIG. 2B. In this case, the use orientation determining unit 112 can determine that the use orientation of the mobile communications terminal 100 is the "horizontal orientation." Consequently, key emphasis corresponding to the horizontal orientation can be performed through the same process as the key emphasizing process shown in FIG. 7.

In a apparatus having a housing that can open and close in two orientations, such as in the mobile communications terminal 100 illustrated in the examples of embodiment described above, the use orientation can be determined by the orientation of opening and closing, and thus the appropriate key emphasizing operations can be performed regardless of whether the function that has been executed can be used in the vertical orientation or in the horizontal orientation.

As explained above, given the various embodiments described above as set forth in the present invention, a key layout corresponding to a full keyboard can be achieved without a loss of ease-of-use, even in a small apparatus such as a mobile communications terminal.

Furthermore, keys that have a marking orientation that is appropriate to the use orientation can be provided, regardless of which of the two orientations, vertical or horizontal, or the like, is used for the housing or for the device as a whole depending on the application.

Furthermore, the use orientation can be determined based on the function that is executed or on the opening/closing orientation of the housing, and the keys used in that use orientation are emphasized automatically, enabling an improvement in convenience for the user.

The embodiments described above are examples, and do not limit the scope of applicability of the present invention. In other words, a variety of applications are possible, and all forms of embodiment lie within the scope of the present invention.

For example, although in the various embodiments described above, the shape of the keys was illustrated as being a diamond shape, other shapes, such as, for example, circles or equilateral hexagons can be used instead, insofar as they are symmetrical both vertically and horizontally, and can be arranged in a staggered pattern (mutually differing).

Moreover, while in the second and third embodiments, described above, the key emphasizing operation was performed through illuminating key units, any emphasizing method may be used, not limited thereto, insofar as the markings on the keys to be used are emphasized. For example, if it is possible to illuminate a single key partially, then the marking parts (the parts that are printed with characters, etc.) of the keys to be used may be illuminated instead. Conversely, if the markings of characters, and the like, are structured using an electroluminescent display on each key, for example, rather than printed key markings, the markings may be for only the characters, or the like, associated with the use orientation. Furthermore, by having a different level of light-emission brightness for the light sources for the respective rows of keys corresponding to the first and second rows of keys, the third and fourth rows of keys, and the fifth and sixth rows of keys, the fact that these sets of rows correspond to the respective individual rows in the full keyboard may be emphasized.

The key markings (key tops) in the various embodiments described above are examples, and the number of keys, the method of layout, the characters, etc., marked on the key tops, and so forth, may be selected as desired. Furthermore, the use orientations corresponding to the functions that are executed, the keys to be emphasized depending on the use orientation, and so forth, may be selected as desired. In this case, the key setting table may be set up as appropriate, enabling appropriate key emphasizing operations. In other words, while in the second embodiment and the third embodiment, described above, all of the keys were emphasized when the vertical orientation was detected, this operation does not constitute a limitation.

Furthermore, while in the embodiments described above examples were presented wherein the mobile apparatus as set forth in the present invention was embodied as a mobile communications terminal, the mobile apparatus to which the present invention can be applied is not limited to a mobile communications terminal, insofar as the apparatus can be used in two orientations.

Note that the present invention can be provided as a mobile apparatus that is provided in advance with an input apparatus 130 having a keyboard 131, as in the case of the mobile communications terminal 100, described above, or can be provided as the input apparatus 130 portion alone. In this case, an apparatus similar to the mobile communications terminal 100, described above, is possible through changing only the input apparatus of an existing mobile apparatus (a mobile communications terminal, or the like).

In this type of case, a program that executes the control unit 110 of the mobile communications terminal 100, as described above, may be installed and executed to provide functions identical to those of the mobile communications terminals 100 described above.

In this case, a program for executing the various processes described above may be installed and a computer (a CPU, or the like) for controlling the applicable apparatus (a mobile communications terminal, or the like) may execute the program to cause functioning as the mobile communications terminal as set forth in the present invention.

Not only is it possible to apply the present invention to any given apparatus by selecting the installation method for this program appropriately, for example, by providing this program through a communications medium such as the Internet, it is also possible to perform installation through distribution of the program stored in a predetermined recording medium (such as a memory card, a CD-ROM, a DVD, or the like).

The present invention can be used in an apparatus that performs efficient input with excellent ease-of-use.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-60627 filed on Mar. 9, 2007 and including specification, claims, drawings and summary. The disclosure of the above Japanese Patent Application is incorporated herein by reference in its entirety.

What is claimed is:

1. An input apparatus that can be used in two orientations and comprises keys;
   wherein the keys are symmetrical both vertically and horizontally, on which markings are applied in one or two orientations, depending on an orientation in which the input apparatus will be used,
   wherein the keys are laid out in a staggered pattern in close proximity in a plane, and
   wherein each of the keys is diamond-shaped and the keys are arranged so that the markings on key tops of the keys line up along a horizontal axis extending through two staggered, vertically-adjacent horizontal arrays of the keys in a horizontally open position of the input apparatus,
   wherein each said diamond-shaped key is actuatable to supply to the input apparatus information corresponding to the marking on the key top of the respective diamond-shaped key,
   wherein some of said diamond-shaped keys are configured to correspond to a first function in the vertical orientation and a second function in the horizontal orientation,
   wherein the first function corresponding to the vertical orientation and the second function corresponding to the horizontal orientation are established based on a ratio of a screen to be displayed,
   wherein a setting information storage unit of the input apparatus includes a function setting table that indicates which of said first and second functions is currently executable depending on whether the input apparatus is in the vertical orientation or the horizontal orientation
   wherein the setting information storage unit further includes a key setting table that allows a use orientation of the input apparatus to associate with a key to be emphasized, and
   wherein the input apparatus emphasizes a key corresponding to a function executed by the input apparatus based on the function setting table and the key setting table.

2. The input apparatus as set forth in claim 1, wherein the markings corresponding to one of the two orientations that can be used by the input apparatus are located on a line passing through each key, in a lengthwise direction, in two rows of the keys that are adjacent to each other vertically in the staggered pattern array.

3. The input apparatus as set forth in claim 1, wherein the first function is for executing an application software when the input apparatus is in the horizontal orientation and the second function is for inputting one letter of the alphabet when the input apparatus is in the vertical orientation.

4. The input apparatus as set forth in claim 1, wherein the keys are laid out oriented so that edges of the diamond shapes are not parallel with edges that form the plane wherein the keys are laid out.

5. The input apparatus as set forth in claim 4, wherein:
   the plurality of keys that are shaped in the diamond shapes are laid out on a straight line so that crowning points of the diamond shapes are adjacent to each other to form a plurality of rows of the keys;
   the edges of the diamond-shaped keys that structure the one row of keys are adjacent to the edges of the diamond-shaped keys that structure another row of keys to form the two rows of keys.

6. A mobile apparatus comprising a housing that is structured from a substantially rectangular surface and an input apparatus that is structured on one face of the housing, the mobile apparatus being capable of executing functions that are used when the housing is in the vertical orientation and capable of executing functions that are used when the housing is in the horizontal orientation;
   wherein the input apparatus comprises a keyboard with keys that are symmetrical both vertically and horizontally, and with keys that have markings on key tops in one or two orientations depending on the orientation in which the housing will be used, and are laid out in a staggered pattern in close proximity in a plane,
   wherein some of said keys are diamond-shaped and the keys are arranged so that the markings on the key tops line up along a horizontal axis extending through two staggered, vertically-adjacent horizontal arrays of the keys in a horizontally open position of the input apparatus,
   wherein each of said diamond-shaped key is actuatable to supply to the input apparatus information corresponding to the marking on the key top of the respective diamond-shaped key,
   wherein some diamond-shaped keys are configured to correspond to a first function in the vertical orientation and a second function in the horizontal orientation,
   wherein the first function corresponding to the vertical orientation and the second function corresponding to the horizontal orientation are established based on a ratio of a screen to be displayed, and
   wherein a setting information storage unit of the input apparatus includes a function setting table that indicates which of said first and second functions is currently executable depending on whether the input apparatus is in the vertical orientation or the horizontal orientation
   wherein the setting information storage unit further includes a key setting table that allows a use orientation of the input apparatus to associate with a key to be emphasized, and
   wherein the input apparatus emphasizes a key corresponding to a function executed by the input apparatus based on the function setting table and the key setting table.

7. The mobile apparatus as set forth in claim 6, wherein the keyboard is laid out with keys are laid out in a staggered pattern array, the key top markings corresponding to a case when the mobile apparatus is used in the horizontal orientation are marked so as to be located on a line passing through each key in two rows of the keys that are adjacent to each other vertically.

8. The mobile apparatus as set forth in claim 6, wherein the diamond-shaped keys are laid out oriented so that edges of the diamond shapes are not parallel with edges of a face structure of the input apparatus.

9. The mobile apparatus as set forth in claim 6, wherein the first function is for executing an application software when the input apparatus is in the horizontal orientation and the second function is for inputting one letter of the alphabet when the input apparatus is in the vertical orientation.

10. The mobile apparatus as set forth in claim 6, further comprising a key emphasizing unit for emphasizing the markings of the keys according to the orientation of the mobile apparatus used by a function depending on the function that is executed by the mobile apparatus.

11. The mobile apparatus as set forth in claim 10, further comprising an orientation detecting unit for detecting the orientation of use of the mobile apparatus; wherein the key emphasizing unit identifies the keys to be emphasized based on the orientation detected by the orientation detecting unit.

12. The mobile apparatus as set forth in claim 10, wherein:
the mobile apparatus is structured from at least two housings that can open and close in both the vertical and the horizontal orientations;
the key emphasizing unit identifies the keys to be emphasized based on the opening and closing orientation of the housing at least two housings.

13. A nontransitory information recording medium storing a program for causing a computer, which controls a mobile apparatus provided with a keyboard with markings that have in one or more marking orientations in one or two orientations, depending on an orientation of use of the mobile apparatus that is capable of executing functions that are used in vertical orientation and functions that are used in the horizontal orientation orientations, to execute:
a function for determining the orientation used by the mobile apparatus;
a function for specifying keys of the keyboard to be emphasized, based on the determined orientation of use; and
a function for controlling the emphasis of the specified keys;
wherein the keys are laid out in a staggered pattern in close proximity in a plane,
wherein some of the keys are diamond-shaped and the diamond-shaped keys are arranged so that the markings on the keyboard line up along a horizontal axis extending through two staggered, vertically-adjacent horizontal arrays of the keys in a horizontally open position of the mobile apparatus,
wherein each said diamond-shaped key is actuatable to supply to the input apparatus information corresponding to the marking on the key top of the respective diamond-shaped key,
wherein some of said diamond-shaped keys are configured to correspond to a first function in the vertical orientation and a second function in the horizontal orientation,
wherein the first function corresponding to the vertical orientation and the second function corresponding to the horizontal orientation are established based on a ratio of a screen to be displayed,
wherein a setting information storage unit of the input apparatus includes a function setting table that indicates which of said first and second functions is currently executable depending on whether the input apparatus is in the vertical orientation or the horizontal orientation,
wherein the setting information storage unit further includes a key setting table that allows a use orientation of the input apparatus to associate with a key to be emphasized, and
wherein the input apparatus emphasizes a key corresponding to a function executed by the input apparatus based on the function setting table and the key setting table.

14. The information recording medium as set forth in claim 13, wherein the first function is for executing an application software when the input apparatus is in the horizontal orientation and the second function is for inputting one letter of the alphabet when the input apparatus is in the vertical orientation.

\* \* \* \* \*